United States Patent
Van der Steen

(10) Patent No.: US 7,632,117 B1
(45) Date of Patent: Dec. 15, 2009

(54) CARD CONNECTOR WITH EJECTING MEMBER

(75) Inventor: Hendrkus P. G. Van der Steen, Den Dungen (NL)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/218,784

(22) Filed: Jul. 17, 2008

(51) Int. Cl.
*H01R 13/62* (2006.01)
(52) U.S. Cl. ..................................................... 439/159
(58) Field of Classification Search .................. 439/159
See application file for complete search history.

(56) References Cited

U.S. PATENT DOCUMENTS

| | | | | |
|---|---|---|---|---|
| 6,478,591 | B1 * | 11/2002 | Chang | 439/159 |
| 6,802,726 | B2 * | 10/2004 | Chang | 439/159 |
| 7,108,557 | B2 * | 9/2006 | Kikuchi et al. | 439/630 |
| 7,238,034 | B2 | 7/2007 | Matsukawa et al. | |

FOREIGN PATENT DOCUMENTS

| | | |
|---|---|---|
| CN | 2657224 Y | 11/2004 |
| TW | M288021 | 2/2006 |

* cited by examiner

*Primary Examiner*—Tho D Ta
(74) *Attorney, Agent, or Firm*—Ming Chieh Chang; Wei Te Chung; Andrew C. Cheng

(57) ABSTRACT

An electrical card connector for receiving an integrated circuit card comprises an insulative housing having a base, left and right side walls, and a rear wall to commonly define a rectangular receiving space therebetween, an ejecting member disposed adjacent the right side wall and within the receiving space, the ejecting member including a slider defining a locking head engageable with a recess defined on the card, and a driving end proximate to the rear wall; a shell assembled onto the insulative body for covering a top face thereof. A partition wall extends forward with a distance from the rear wall to partly separate the receiving space into a first region for the card, and a second region for the ejecting member. The slider has at least a portion engaging the partition wall to prevent rotation of the slider when the card is locked in an operation position by the slider.

19 Claims, 8 Drawing Sheets

CARD CONNECTOR WITH EJECTING MEMBER

BACKGROUND OF THE INVENTION

1. Field of the Invention

The present invention relates to a card connector, and more particularly to a card connector incorporated with an ejecting member interengaged to a partition wall thereof so as to stabilize it during operation.

2. Description of Related Art

IC (integrated circuit) cards are known in the art and contain artificial intelligence in the form of a memory circuit or other electronic program. A card reader is used to read the information or retrieve the memory stored on the card. IC cards are used in countless applications today, including video cameras, smart-phones, music players, ATMs, cable television decoders, toys, games, pc adapters and other electronic applications.

A typical card connector is described in Taiwan Patent TW M288021, hereinafter referred to as the '021 patent. The card connector disclosed in this issue connection, The '201 patent discloses a connector body comprising a housing with a receiving slot for receiving a card and a metal shell for covering the housing. The connector further includes an ejecting device comprising a slider which is pushed in during insertion of the card and slides between a forward position or loading position of the card and a back position or insertion position of the card, a spring for biasing the slider to its back position and a cam mechanism for limiting the sliding operation of the slider. The mechanism is provided on a top surface of the slider and comprises a first guide groove defining the forward position of the slider, a second guide groove defining the back position of the slider, and a pin member for movement within the grooves which defines the slider's position. The slider is received in an elongate recess communicating with the receiving slot and adjacent to a side of the housing, and said slider is covered by the metal shell. The surface of the recess is lower than the receiving slot for guiding the slider slide between the forward position and the back position.

A typical problem of this type connector is that the difference in height between the recess and the receiving slot is unobvious as the measure of the connector becomes smaller and smaller, so the guiding effect on the slider of the recess is insignificant, and the slider would slide or slant into the receiving slot, maybe cause the card is unlocked in the loading position.

Another problem is that when ejecting the card out of the loading position by a double push operation, the force of the spring is so strong to eject the card fly out of the receiving slot.

Hence, an improved card connector is highly desired to overcome the aforementioned disadvantages of the prior art.

SUMMARY OF THE INVENTION

Accordingly, an object of the present invention is to provide a partition wall extending forward with a distance from a rear wall of the housing to partly separate the receiving space into a first region for receiving a card, and a second region for receiving an ejecting member; so as to effectively and stably interlock/lock an inserted card therein.

To achieve the above object, an electrical card connector for receiving an integrated circuit card comprises an insulative housing having a base, left and right side walls, and a rear wall to commonly define a rectangular receiving space therebetween, an ejecting member disposed adjacent the right side wall and within the receiving space, the ejecting member including a slider defining a locking head engageable with a recess defined on the card, and a driving end proximate to the rear wall; a shell assembled onto the insulative body for covering a top face thereof. A partition wall extends forward with a distance from the rear wall to partly separate the receiving space into a first region for the card, and a second region for the ejecting member. The slider has at least a portion engaging the partition wall to prevent rotation of the slider when the card is locked in an operation position by the slider.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
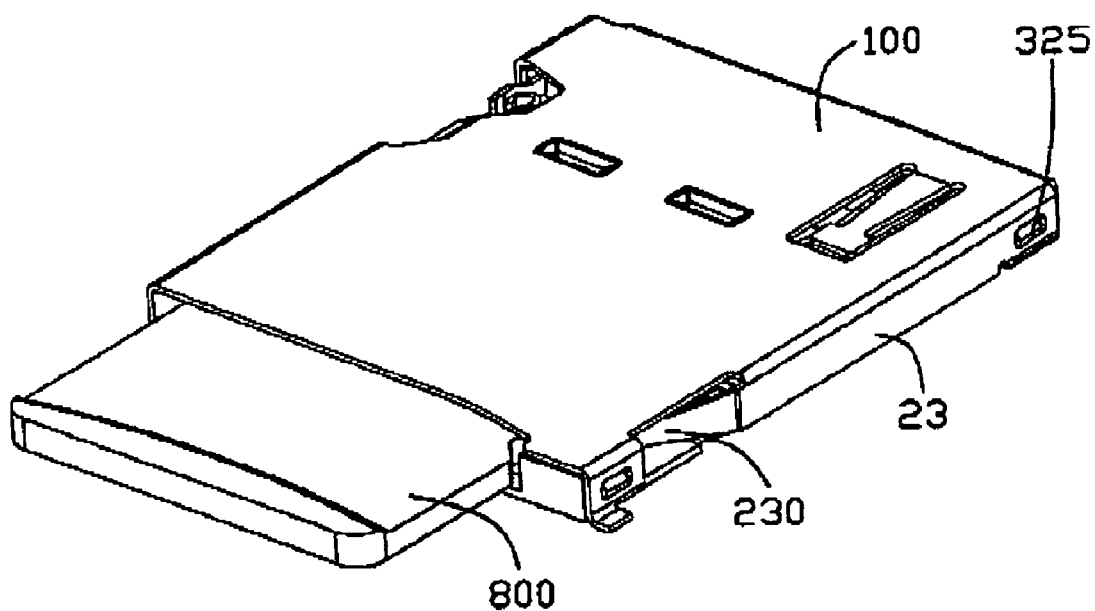
FIG. 1 is an assembled, perspective view of the card connector with a card in accordance with the present invention.
Figure 2:
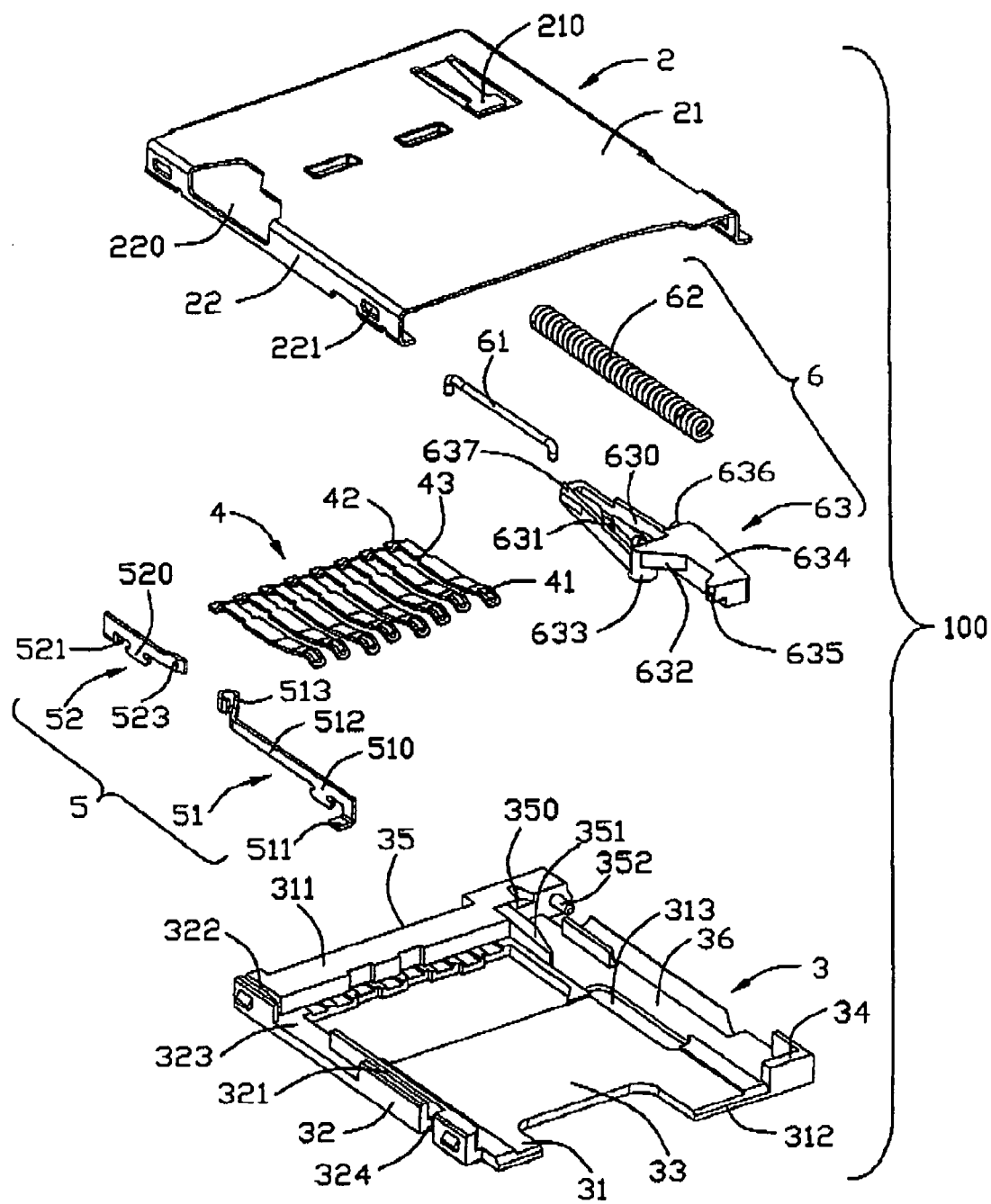
FIG. 2 is an exploded, perspective view of a card connector of FIG. 1.

Referring to FIGS. 1-2, the card connector 100 made in accordance with the present invention is adapted for electrically connecting a card 800 to a printed circuit board (not shown), and comprises an insulating housing 3, a plurality of contacts 4 received in the housing, a detect switch 5 mounted on a side of the housing 3, an ejecting device moveably mounted on the other side of the housing 3, a metal shell 2 for covering the housing 3.

The housing 3 is generally configured in a frame configuration. The housing 3 comprises a base 31, a left and right side walls 32, 34 extending upward from opposite sides of the base 31, and a rear wall 35 extending upward from a rear end 311 of the base 31 to commonly define a rectangular receiving space (not labeled) and an opening (not labeled) adjacent to a front end 312 of the base 31 for inserting the inserted card. The base 31 is provided with a plurality of passageways 310 extending in an inserting direction of the card 800 at the rear end 311 for mounting the corresponding contacts 4. A first slit 321 and a second slit 322 extend from the top surface of the left side wall 32 and are cut out by a cross-section 323, a cutout 324 is formed on the left side wall 32 facing outward, communicating with an end of the first slit 321 and adjacent to the front end 312. A partition wall 351 extending forward with a distance from the rear wall to partly separate the receiving space into a first region 33 for receiving the card 800, and a second region 36 for receiving the ejecting member; A first positing pole 352 extends from the inside of the rear wall 35 and protrudes into the second region 36, and a locating hole 350 is sank from the upper surface of the rear wall 35 into interior and lying between the partition wall 351 and the first positing pole 352. An bottom groove 313 is formed on the base 31 and extends in the card 800 insertion/ejection direction below the second region 36. Several tabs 325 are formed on the outer surface of the side walls 32.

The metal shell 2 covering the housing 3 is formed by stamping and forming a thin metal plate, and has an upper portion 21 and right and left plate portions 22 and 23. A plurality of notches 221 are formed on right and left plate portions 22 and 23 corresponding to the tabs 325 of the housing 3, and engage with the corresponding tabs 325 for mounting the shell 2 onto the housing 3. A window 220 is formed on the left plate portion 22 corresponding to the cross-section 323, and an elastic portion 230 tears from the right plate portion 23 and extends forward and slantways into the second region 36. An spring arm 210 was formed on upper portion 21 adjacent to the second region 36.

The contact 4 comprises a first contacting portion 41 extending slantways and upwardly for contacting a corresponding contacting pad (not shown) of the card, a first soldering portion 42 extending backwardly for soldering onto the printed circuit board, and a first connecting portion 43 connecting the first contacting portion 41 and the first soldering portion 42. Each contact 4 is mounted in the corresponding passageway 310, wherein the first contacting portion 41 extending from the passageway 310 and protruding into the first region 33, and the first soldering portions 43 protruding out of the rear end 311 of the housing 3.

The detect switch 5 comprises a first switch contact 51 mounted in the first slit 321 of the housing 3 and a second switch contact 52 mounted in the second slit 322. The first switch contact 51 comprises a second connecting portion 510 fixed in the first slit 321, a second soldering portion 511 extending from a bottom of the second connecting portion 510 vertically and received in the cutout 324, a second elastic arm 512 extending from one lateral side of the second connecting portion 510 along the first slit 321 in the inserting direction of the card 800, and a second contacting portion 513 formed on a free end of the second elastic arm 512, crossing the cross-section 323 and protruding into the first region 33. The second switch contact 52 comprises a third connecting portion 520 fixed in the second slit 322, a third soldering portion 521 extending from a bottom of the third connecting portion 520 vertically, and a third contacting portion 523 extending from one lateral side of the third connecting portion 520, located in the cross-section 323 and separated from the second contacting portion 513 without the card 800 inserted, and could being saw from the window 22.

The ejecting member includes: a slider 63 which moves in a sliding direction in response to the insertion of card 800 and slides between a forward position or loading position of card 800 whereat the contacts 4 are not in contact with the corresponding card contacts, and a back position or a insertion position of card 800 whereat the contacts 4 are in contact with the corresponding card contacts; a coil spring 62 for biasing the slider 63 to the back position of the card, and a cam mechanism for guiding and defining the sliding operation of the slider 63.

The cam mechanism is provided on a top surface of the slider 63, and is provided with a first groove cam follower region 630 defining the first forward position of the slider 63, a second groove cam follower region 631 defining the back position of the slider 63, and a cam follower 61 for moving within groove cam follower region 630 and 631 and defining the sliding position of the slider 63. The groove cam follower region 630 and 631 has a nonlinear closed path defining a central point, where the cam follower has one end located at the central point defines an operation position where the card is locked. The two groove cam follower regions 630 and 631 are defined on a top surface of a front end of the slider 63.

The slider 63 is received within the second region 36 and is covered by metal shell 2. The slider 63 further comprises a body 634 adjacent to the groove cam follower region 630 and 631, an engaging portion 537 with said groove cam follower region 630, 631 thereon located in an inner side of the second region 36, a driving portion 632 formed on one side of the body 634 adjacent to the second groove cam follower region 631, and extending slantways into the first region 33, a bottom header 633 protruded from the bottom of intersection of the second groove cam follower region 631 and the driving portion 632, and could moveably sliding in the bottom groove 313, a locking head 635 extending from the same side to the driving portion 632 of the body 634, and separated from the driving portion 632 for a distance, and a second positing pole 636 protruding from the rear end of the body 634 and separated from the guiding grooves for a distance. The bottom header 633 is located between the engaging portion 637 and the driving portion 632, while the driving portion 632 is located between the engaging portion 637 and the locking header 635, said driving portion 632 has a slant surface opposite to the card 800, the slant surface is nearer to the card 800 than any portion of the engaging portion 637.

The spring 62 is sandwiched by the first positing pole 352 and the second positing pole 636. A first end of the cam follower 61 rotatably mounted in the locating hole 350, and a second end of the cam follower 61 slidely mounted in the guide grooves.

The card 800 has an engaging portion 801 engaging with the driving portion 632 so as to push the slider to the insertion position, and a recess 802 receiving the locking head 635 for locking the card at the insertion position.

Figure 3:
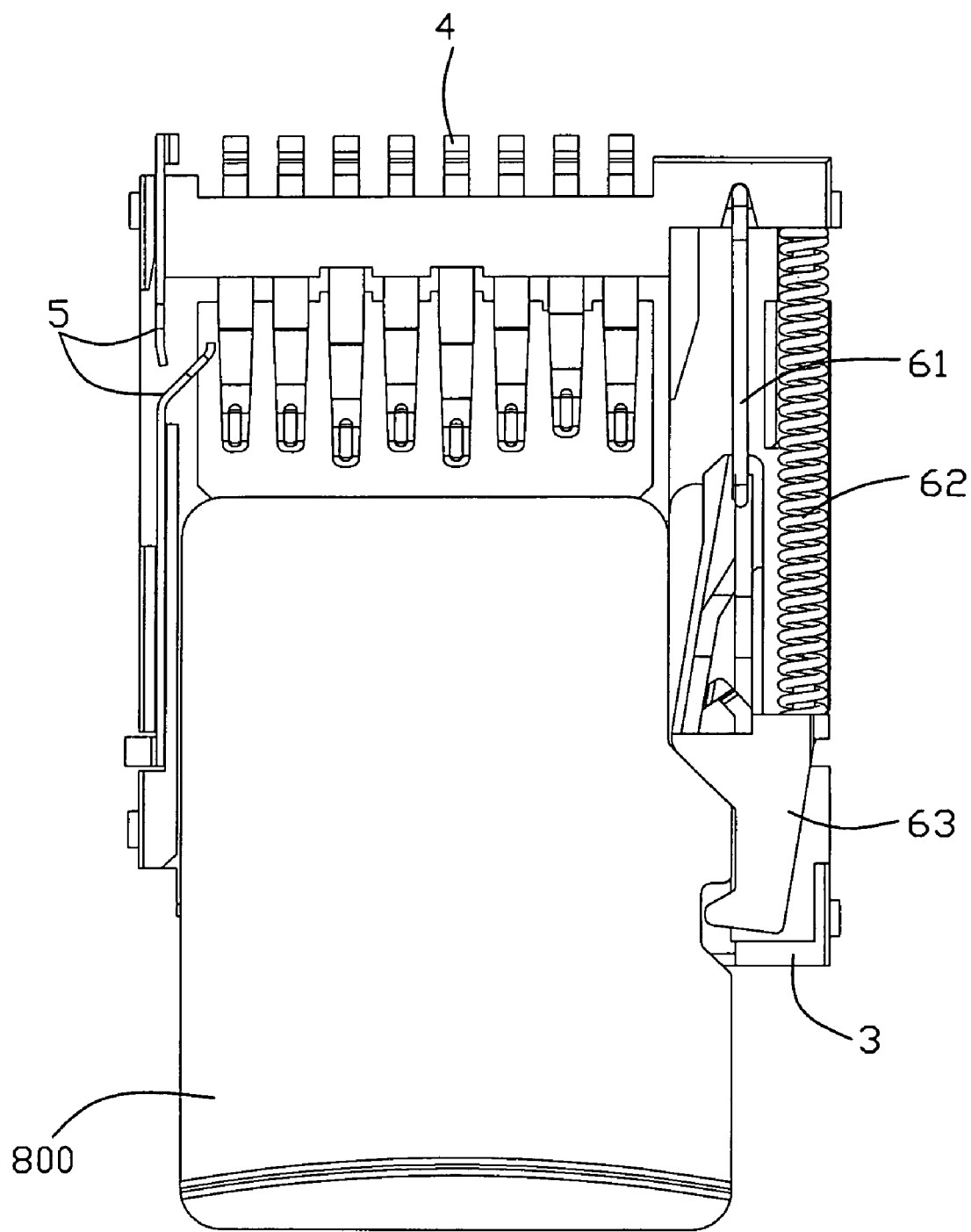
FIG. 3 is another assembled, perspective view of the card connector eliding the metal shell of FIG. 1 when inserting the card into the receiving space at a first position, and the slider is at a forward position.
Figure 4:
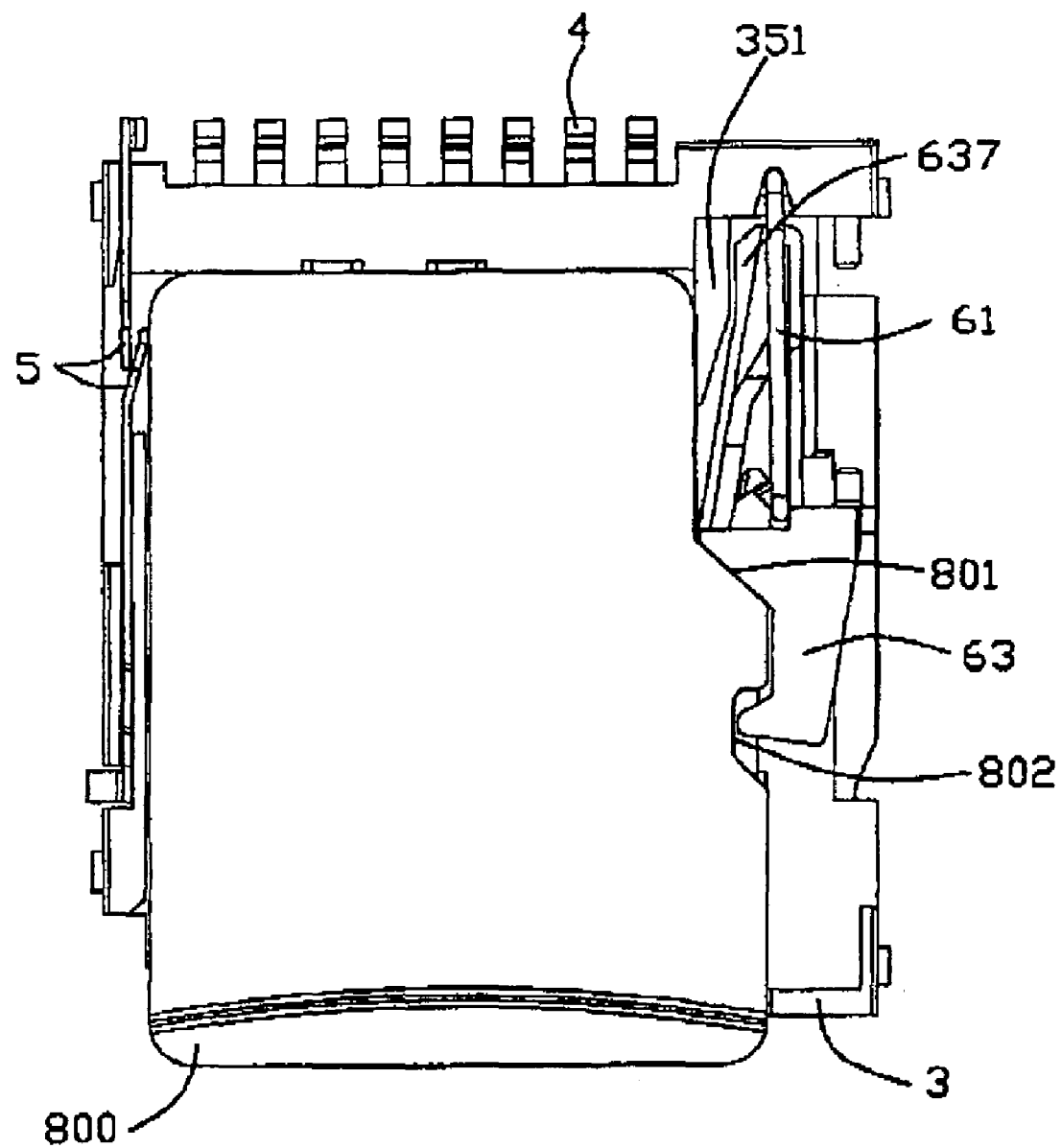
FIG. 4 is another assembled, perspective view of the card connector eliding the metal shell and the spring of FIG. 1 when inserting the card into the receiving space at a second position, and the card isn't pushed backward anymore.
Figure 5:
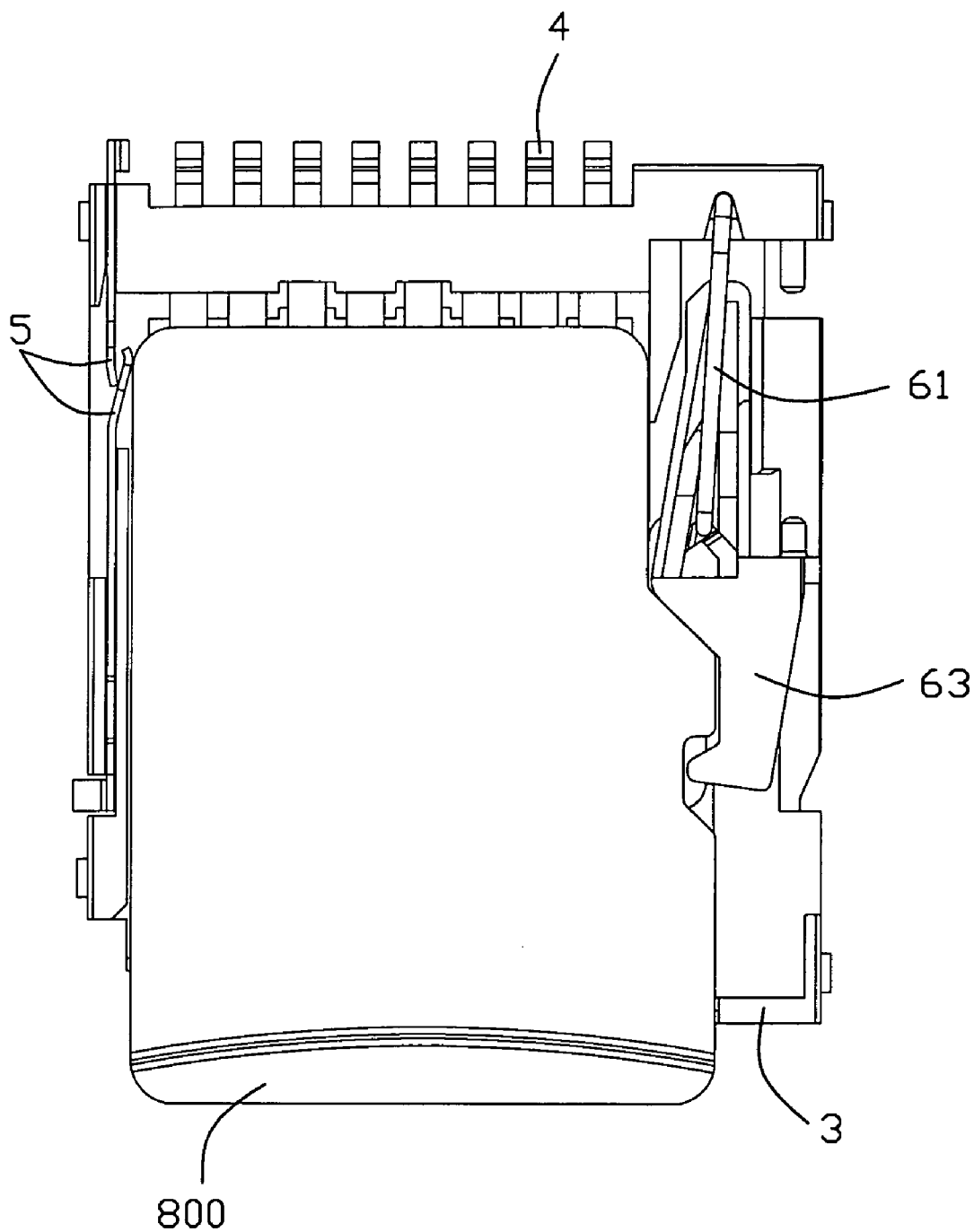
FIG. 5 is another assembled, perspective view of the card connector eliding the metal shell and the spring of FIG. 1 when inserting the card into the receiving space at a third position named an operation position where the card is locked and where a cam follower has one end located at a central point of a nonlinear closed path.
Figure 6:
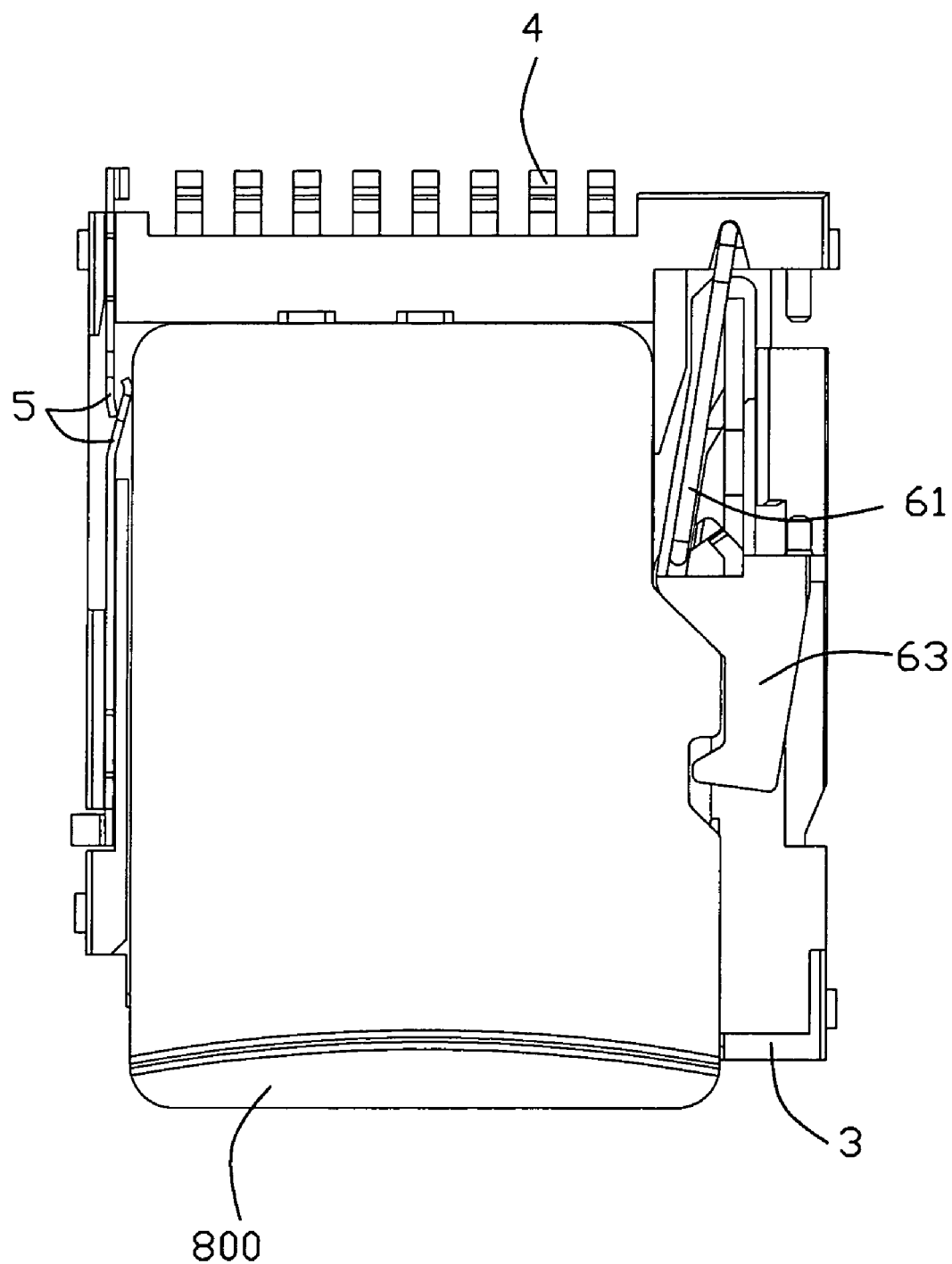
FIG. 6 is another assembled, perspective view of the card connector eliding the metal shell and the spring of FIG. 1 when ejecting the card out of the receiving space at the second position.
Figure 7:
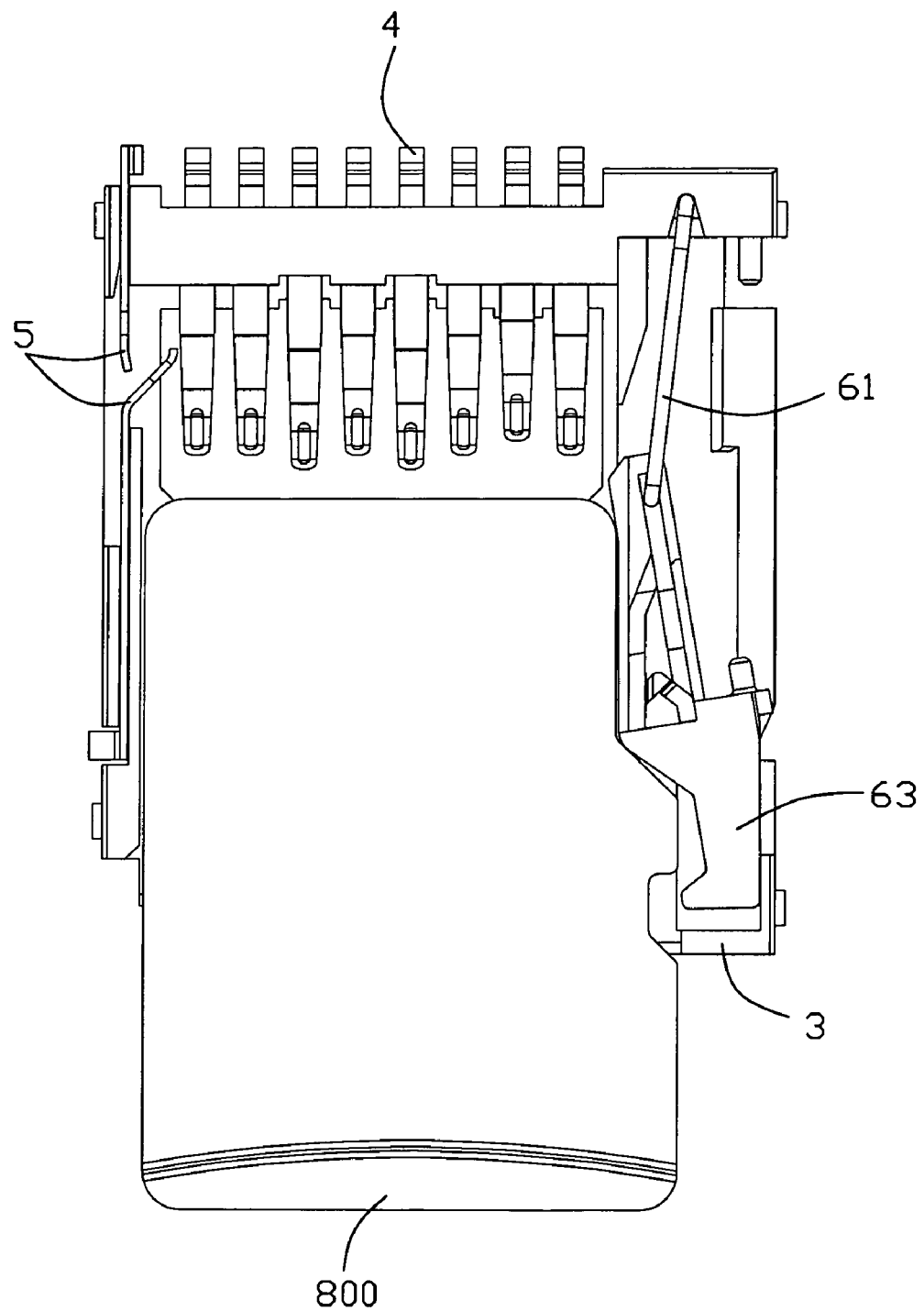
FIG. 7 is another assembled, perspective view of the card connector eliding the metal shell and the spring of FIG. 1 when ejecting the card out of the receiving space at a fourth position.
Figure 8:
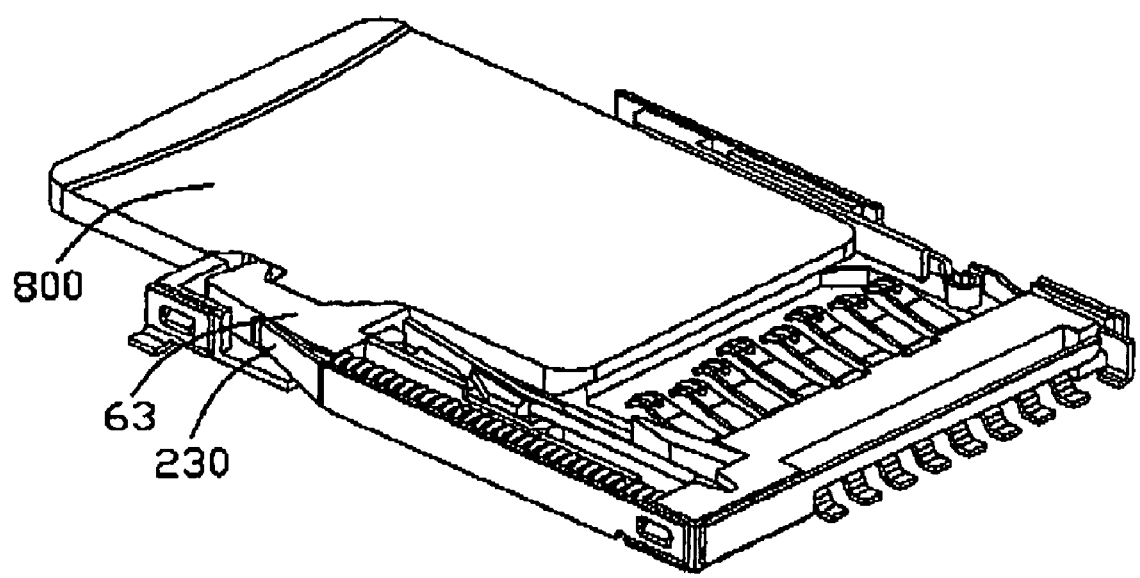
FIG. 8 is another assembled, perspective view of the card connector after the top of the shell is removed to show the engagement between the shell and the slider.

The movement of the ejecting member is shown in FIGS. 3 through 7. FIG. 3 shows the initial condition or the back position of the card 800 where the engaging portion 801 of the card 800 doesn't push the driving portion 632 of the slider. Push the card 800 backward, reference to FIG. 4, the card is at a second position or a limit position, the second contacting portion 513 of the first switch contact 51 engages with the third contacting portion 523 of the second switch contact 52 so as to inform corresponding circuit the card 800 inserted, insertion of the card 800 gives a force for said locking header 635 of the ejecting member 6 and thereby generates an anticlockwise torque for said locking header 635 in cooperation with said bottom header 633, which defines a pivot point; release the card 800, reference to FIG. 5, the card is at a third position or a locking position, the partition wall 351 separates a leading end of the card 800 from the slider 63, at least a portion of the slider engaging the partition wall to prevent rotation of the slider. Push the card 800 again, reference to FIG. 6, the card is pushed to the limit position; and release the card 800, the spring 62 push the card to the back position again, the first switch contact 51 separates from the second switch contact 52, and the elastic portion 230 of the shell 2 engages with a side surface of the slider to push the slider so as to assist in the engagement between the locking header and the card and prevent the card 800 flying out of the first region 33 after a sudden card release; finally, the card could be gripped and pulled out of the connector, reference to FIG. 7, a side of the card pushes the slider to rotate and the locking head 635 escapes from the recess 802.

The present card connector 100 takes advantage of the partition wall 351 extending forward with a distance from the rear wall 35 of the housing 3 partly separates the receiving space into the first region 33 for receiving the card 800, and a second region 36 for receiving the ejecting member 6, when the card 800 is inserted to an inner position adjacent to the rear wall, a distal end of the engaging portion 637 of the slider 63 abuts against the partition wall 351 to prevent rotation of the slider 63 into the first region 33, therefore the card 800 could be locked steadily. As shown in FIG. 3, the card 800 abuts against a slanted surface of the driving portion 632, which generates a anti-clockwise torque on the slider 63.

Additionally, the elastic portion 230 tearing from the right plate portion 23 engages with a side surface of the slider 63 to push the slider 63 so as to assist in the engagement between the locking header 635 and the card 800 and prevent the card 800 flying out of the first region 33 after a sudden card release While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector for insertion of a card in an inserting direction, comprising:
    an insulative housing having a base, two opposite side walls, and a rear wall to commonly define a rectangular receiving space therebetween;
    a partition wall extending in a second direction opposite to the inserting direction and adjacent to the rear wall to partly separate the receiving space into a first region for the card, and a second region for an ejecting member;
    the ejecting member disposed within the second region of the receiving space, the ejecting member including a slider and a spring constantly urging the slider in the second direction, the slider defining a locking head engageable with a notch of the card, an engaging portion with guiding grooves and a driving portion between the locking head and the engaging portion; wherein
    the driving portion abuts against the card all through the insertion of the card into the first region, a distal end of the engaging portion abuts against the partition wall when the card shifts adjacent to the rear wall.

2. The electrical card connector of claim 1, wherein the ejecting member further includes a cam follower with a first end assembled onto the rear wall of the insulative housing, and a second end assembled in the guiding grooves.

3. The electrical card connector of claim 1, wherein the slider has a bottom head receiving and sliding in a bottom groove of the insulative housing so as to allow the slider to slide in the inserting direction.

4. The electrical card connector of claim 3, wherein the bottom head is located between the engaging portion and the driving portion, the driving portion has a slant surface opposite to the card, the slant surface is nearer to the card than any portion of the engaging portion.

5. The electrical card connector of claim 1, wherein a first slit for receiving a first switch contact and a second slit for receiving a second switch contact extend from a top surface of one side wall and are cut out by a cross-section, a second contacting portion of the first switch contact crosses the cross-section and protrudes into the receiving space, a third contacting portion of the second switch contact located in the cross-section and separated from the second contacting portion without the card inserted.

6. The electrical card connector of claim 5, wherein the electrical card connector further includes a shell assembled onto the insulative housing for covering a top face thereof, a window is formed on the shell corresponding to the cross-section, the second and third contacting portions could be seen from the window.

7. The electrical card connector of claim 1, wherein the slider has a bottom header, a bottom of the insulative housing defines a bottom groove for said bottom header to slide, insertion of the card gives a force for said slider of the ejecting member and thereby generates an anti-clockwise torque for said locking header in cooperation with said bottom header, which defines a pivot point.

8. The electrical card connector of claim 7, wherein the electrical card connector further includes a shell assembled onto the insulative housing for covering a top face thereof, the shell has an upper portion and right and left plate portions, and an elastic portion tearing from the right plate portion engagable with a side surface of the slider to push the slider so as to assist in the engagement between the locking header and the card.

9. An electrical card connector for a card, comprising:
    an insulative housing having a base, two opposite side walls and a rear wall with a plurality of terminals, the walls commonly define a card receiving region and an ejecting member receiving region parallel to the card receiving region;
    an ejecting member disposed adjacent to one side wall, the ejecting member including a slider and a spring constantly urging the slider in a reverse direction to an inserting direction of the card;
    wherein a front end of the slider generates a torque toward the card receiving space and the insulative housing defines a partition wall to abut against the front end of the slider.

10. The electrical card connector of claim 9, wherein the slider has a bottom header, said base of the insulative housing defines a bottom groove for said bottom header to slide, insertion of the card gives a force for said slider of the ejecting member and thereby generates an anti-clockwise torque for said locking header in cooperation with said bottom header, which defines a pivot point of said anti-clockwise torque.

11. The electrical card connector of claim 9, wherein the partition wall extending forward with a distance from the rear wall, said slider has at least one engaging portion engaging with the partition wall to prevent rotation of the slider when the card is locked in an inner position by the slider.

12. The electrical card connector as claimed in claim 9, wherein the ejecting member further includes a cam follower with a first end and a second end, the slider defines a groove cam follower region for a second end of the cam follower to follow, the card has a main portion received in the card receiving region, a minor portion invading into the ejecting member receiving region and spaced away from the partition wall when the card is locked in an operation position.

13. The electrical card connector as claimed in claim 12, said groove cam follower region having a nonlinear closed path defining a central point where the cam follower has one end located at, and said central point defines said operation position where the card is locked.

14. An electrical connector assembly comprising;
an insulative housing defining a card receiving space;
a card having a notch on a side and inserted into the card receiving space in an insertion direction;
a plurality of contacts disposed in the housing and extending into the card receiving space;
an ejecting member including:
a slider equipped with a locking head for engagement within t he notch, and a guiding groove where a cam follower is guidably received; and
a spring constantly urging the slider in an ejection direction opposite to the insertion direction; wherein
said slider performs both linear movement along the mating direction and a rotative movement to have the locking head inwardly rotated for engagement with in the notch when slider is pushed rearward by the card to an inner position along the mating direction, and to have the locking head outwardly rotated when the slider is pushed forward by the spring to an outer position along said ejection direction; wherein
said slider forms a structure to snugly comply with another structure of the housing so as to assure reliable engagement between the locking head and the notch during to inward rotation of the slider with regard to the housing when said slider is in the inner position.

15. The connector assembly as claimed in claim 14, further including a metallic shell covering the housing, and said shell further comprises as elastic arm urging the slider to rotate inwardly when said slider is moved to the inner position.

16. The connector assembly as claimed in claim 14, wherein said another structure on the housing restricts the slider from outward rotating so as to assure the engagement of the locking head within the notch.

17. The connector assembly as claimed in claim 14, wherein said structure and said another structure include a header moveably sliding in an elongated groove, which extends along a front-to-back direction thus only allowing said header to move along a front-to-back direction, under condition that said header and said groove are located at an inward position with regard to the spring so as to assure inward rotation of the slider when said slide is pushed to the inner position.

18. The connector assembly as claimed in claim 17, wherein said header is located at the slider and said groove is located in the housing.

19. The connector assembly as claimed in claim 18, wherein said header is spaced from the locking head with a distance in said front-to-back direction but close to a position where the spring abuts against the slider.

* * * * *